United States Patent
Turnbeaugh

(10) Patent No.: US 10,534,104 B2
(45) Date of Patent: Jan. 14, 2020

(54) PROXIMITY PROBE INTERCHANGE COMPENSATION

(71) Applicant: General Electric Company, Schenectady, NY (US)

(72) Inventor: Lysle Turnbeaugh, Minden, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/057,055

(22) Filed: Aug. 7, 2018

(65) Prior Publication Data

US 2019/0072688 A1 Mar. 7, 2019

Related U.S. Application Data

(63) Continuation of application No. 14/669,677, filed on Mar. 26, 2015, now Pat. No. 10,067,256.

(51) Int. Cl.
| | | |
|---|---|---|
| *G01V 3/10* | (2006.01) | |
| *G01D 5/20* | (2006.01) | |
| *G01D 5/244* | (2006.01) | |

(52) U.S. Cl.
CPC ............ *G01V 3/10* (2013.01); *G01D 5/20* (2013.01); *G01D 5/2449* (2013.01)

(58) Field of Classification Search
CPC ...... G01D 5/142; G01D 5/145; G01D 5/2033; G01D 5/2241; G01D 5/241; G01B 5/0011; G01B 9/02058; G01C 15/14; G01J 1/4228; G08B 13/19608
USPC ............... 324/72.5, 225, 229–231, 239–243, 324/207.12, 207.17–207.19, 207.26, 329, 324/207.25, 662, 66, 754; 307/116, 117; 73/660–661; 341/15; 340/686.1, 941; 702/155, 158
See application file for complete search history.

(56) References Cited

U.S. PATENT DOCUMENTS

| | | | |
|---|---|---|---|
| 5,025,213 A | | 6/1991 | Dobler |
| 6,029,363 A | * | 2/2000 | Masreliez .......... G01D 5/24452 324/601 |
| 6,081,230 A | * | 6/2000 | Hoshino .............. G01C 21/165 342/357.32 |

(Continued)

FOREIGN PATENT DOCUMENTS

| | | | |
|---|---|---|---|
| CN | 104669066 A | * | 6/2015 |
| CN | 104669066 A | | 6/2015 |

(Continued)

OTHER PUBLICATIONS

Wilhelm, Brant., Proximity Probe System Interchangeability, Don't Build a "Frankenstein" System!, Published on Linkedin.com. Oct. 5, 2016. https://www.linkedin.com/pulse/proximity-probe-system-interchangeability-dont-build-wilhelm-p-e- (Year: 2016).*

(Continued)

*Primary Examiner* — Patrick Assouad
*Assistant Examiner* — Sean Curtis
(74) *Attorney, Agent, or Firm* — Mintz Levin Cohn Ferrris Glovsky and Popeo, P.C.

(57) ABSTRACT

A system includes a proximity probe. The system also includes a probe information element. The probe information element is coupled to the proximity probe. The probe information element includes first data corresponding to one or more first error characteristics of the proximity probe.

21 Claims, 6 Drawing Sheets

(56) References Cited

U.S. PATENT DOCUMENTS

| | | | | |
|---|---|---|---|---|
| 6,346,807 B1* | 2/2002 | Slates | G01B 7/003 | 324/207.11 |
| 6,380,894 B1* | 4/2002 | Boyd | G01S 5/02 | 342/450 |
| 6,427,079 B1* | 7/2002 | Schneider | A61B 5/06 | 324/244 |
| 6,487,787 B1* | 12/2002 | Nahum | G01D 18/008 | 33/702 |
| 6,664,782 B2* | 12/2003 | Slates | G01B 7/003 | 324/207.11 |
| 6,703,827 B1* | 3/2004 | Wolf | G01D 3/022 | 324/207.12 |
| 6,727,687 B2* | 4/2004 | Slates | G01B 7/003 | 324/207.11 |
| 6,727,688 B2* | 4/2004 | Slates | G01B 7/003 | 324/207.11 |
| 6,759,855 B2* | 7/2004 | Frauscher | G01R 31/2829 | 324/207.12 |
| 6,798,194 B2* | 9/2004 | Slates | G01B 7/003 | 324/207.11 |
| 6,803,757 B2* | 10/2004 | Slates | G01B 7/001 | 324/207.12 |
| 6,819,122 B2* | 11/2004 | Slates | G01B 7/003 | 324/699 |
| 6,842,020 B2* | 1/2005 | Slates | G01B 7/003 | 324/207.12 |
| 6,847,217 B2* | 1/2005 | Slates | G01B 7/003 | 324/716 |
| 6,850,078 B2* | 2/2005 | Slates | G01B 7/003 | 324/699 |
| 6,873,148 B2* | 3/2005 | Morimoto | G01D 3/022 | 318/652 |
| 6,879,144 B2* | 4/2005 | Ort | G01R 1/20 | 324/207.26 |
| 7,002,471 B2* | 2/2006 | Geddes | G01D 18/00 | 340/539.23 |
| 7,107,168 B2* | 9/2006 | Oystol | G01C 17/38 | 702/85 |
| 7,141,985 B2* | 11/2006 | Zusman | G01R 1/06705 | 324/607 |
| 7,394,243 B2* | 7/2008 | Tsuchida | H03K 17/9505 | 324/207.13 |
| 7,468,675 B2* | 12/2008 | Morath | G01B 7/023 | 340/539.1 |
| 7,768,258 B2* | 8/2010 | Dobsky | G01B 7/023 | 324/207.12 |
| 7,843,192 B2* | 11/2010 | Galeote | F16C 19/52 | 324/234 |
| 7,866,213 B2* | 1/2011 | Twerdochlib | G01H 1/006 | 702/56 |
| 8,232,888 B2 | 7/2012 | Frederick | | |
| 8,847,780 B2* | 9/2014 | Frederick | F16P 3/14 | 340/686.1 |
| 9,250,714 B2* | 2/2016 | Hiromi | G06F 3/0304 | |
| 9,465,008 B2* | 10/2016 | Groningen | G01N 27/9086 | |
| 9,619,988 B2* | 4/2017 | Braiman | G08B 21/0446 | |
| 9,689,717 B2* | 6/2017 | Remillard | G01D 5/2448 | |
| 10,067,256 B2 | 9/2018 | Turnbeaugh | | |
| 2002/0139191 A1* | 10/2002 | Hedeen | G01M 13/045 | 73/593 |
| 2003/0001564 A1* | 1/2003 | Hayashi | G01D 5/24409 | 324/207.12 |
| 2003/0197603 A1 | 10/2003 | Stewart | | |
| 2004/0000903 A1* | 1/2004 | Morimoto | G01D 3/022 | 324/207.12 |
| 2005/0134446 A1 | 6/2005 | Stewart | | |
| 2005/0151719 A1* | 7/2005 | Geddes | G01D 18/00 | 345/156 |
| 2006/0017554 A1 | 1/2006 | Stewart | | |
| 2007/0132423 A1* | 6/2007 | Ajima | H02P 6/10 | 318/719 |
| 2007/0285245 A1* | 12/2007 | Djuric | G08B 21/0275 | 340/572.1 |
| 2008/0054891 A1* | 3/2008 | Dobsky | G01B 7/023 | 324/207.26 |
| 2008/0278151 A1 | 11/2008 | Wang | | |
| 2009/0211376 A1 | 8/2009 | Landrieve | | |
| 2009/0243605 A1* | 10/2009 | Bouregelas | G01N 27/902 | 324/242 |
| 2009/0314092 A1* | 12/2009 | Twerdochlib | G01H 1/006 | 73/659 |
| 2010/0231208 A1* | 9/2010 | Huggett | G01H 1/003 | 324/239 |
| 2011/0139873 A1* | 6/2011 | Sprenger | G01D 5/2492 | 235/436 |
| 2012/0004851 A1* | 1/2012 | Potyrailo | G01N 33/0073 | 702/19 |
| 2013/0037616 A1* | 2/2013 | Howell | G06K 19/02 | 235/492 |
| 2013/0169270 A1* | 7/2013 | Delbaere | G01D 5/24409 | 324/207.25 |
| 2013/0271628 A1* | 10/2013 | Ku | H04N 5/361 | 348/243 |
| 2013/0311130 A1* | 11/2013 | Horton | F01D 17/02 | 702/142 |
| 2014/0312891 A1 | 10/2014 | Micheau-Cunningham | | |
| 2014/0361903 A1* | 12/2014 | Sawada | G01V 15/00 | 340/686.6 |
| 2015/0048242 A1* | 2/2015 | Remillard | G01D 5/2448 | 250/231.14 |
| 2015/0145764 A1* | 5/2015 | Hiromi | G06F 3/0304 | 345/156 |
| 2015/0162957 A1* | 6/2015 | Saghbini | H04B 5/0062 | 455/41.1 |
| 2015/0168181 A1* | 6/2015 | Turnbeaugh | G01D 7/005 | 702/159 |
| 2015/0362462 A1* | 12/2015 | Groningen | G01N 27/9086 | 324/202 |
| 2015/0371521 A1* | 12/2015 | Braiman | G08B 21/0446 | 340/10.1 |
| 2016/0276969 A1* | 9/2016 | Krefta | G01R 35/005 | |
| 2016/0282497 A1* | 9/2016 | Turnbeaugh | G01V 3/10 | |

FOREIGN PATENT DOCUMENTS

| | | |
|---|---|---|
| CN | 104669066 B * | 2/2017 |
| EP | 2388671 A2 | 11/2011 |
| EP | 2427041 A2 | 3/2012 |

OTHER PUBLICATIONS

Bentley Nevada LLC, Specifications and Ordering Information: 3300XL 8mm Proximity Transducer System, Bentley Nevada LLC 2004. pp. 1-29.

Provib Tech, 3300XL, 7200, 3000 Compatible Proximity Probe Transducers, ProvibTech, www.provibtech.com, no date.

Komljenovic et al., RFID tag antenna for cable indentification application, Sep. 2010, IEEE.

Shinkawa, VK-A Series: Model VK-202A Transducer Instruction Manual, Aug. 2008, Shinkawa Sensor Technology, Inc.

Vassilopoulos, The Use of Proximity Probes for Sterntube Boring Verification and Tailshaft Monitoring on Trials and in Service, Journal of Ship Production, vol. 1, No. 2, May 1985.

Metrix, TXR/TXA Trendsetter, www.metrixvibration.com, DOC #M9761, Rev. L, Dec. 2014.

Komljenovic et al. Bibliographic Information.

* cited by examiner

PROXIMITY PROBE INTERCHANGE COMPENSATION

CROSS-REFERENCE TO RELATED APPLICATIONS

This application is a continuation of U.S. patent application Ser. No. 14/669,677, filed Mar. 26, 2015, entitled "PROXIMITY PROBE INTERCHANGE COMPENSATION," which is herein incorporated by reference in its entirety.

BACKGROUND

Embodiments of the subject matter disclosed herein generally relate to proximity probe systems.

Proximity probe systems are generally used for detecting the position (e.g., displacement) and/or motion (e.g., vibration) of a target object. For example, in various technologies, proximity probes may be used to monitor machines, such as turbines (e.g., gas turbines, wind turbines, steam turbines, etc.), compressors, generators, motors, and others, for out-of-alignment or surface rub conditions. By detecting out-of-alignment or surface rub conditions, the proximity probe system may enable decreased costs and/or downtime associated with repair and/or replacement of parts due to wear.

A proximity probe system may include a proximity probe (e.g., an eddy current probe), an extension cable, and a controller. During manufacturing, each of the components of the proximity probe system may be tested to verify that the error characteristics, such as the gain error (e.g., sensitivity error, incremental scale factor (ISF) error, scaling error), offset error, and/or linearity error (e.g., deviation from best fit straight line (DSL)), of each component are within working standards. However, the actual error characteristics of each component may be unknown by a technician using the components in the field. As a result, the combined error of the components of the proximity probe system, which is hereinafter referred to as interchange error, may be unknown.

BRIEF DESCRIPTION

Several embodiments are summarized below. These embodiments are not intended to limit the scope of the claimed subject matter, but rather these embodiments are intended only to provide a brief summary of possible forms of the disclosed subject matter. Indeed, the disclosed subject matter may encompass a variety of forms that may be similar to or different from the embodiments set forth below.

In one embodiment, a system includes a proximity probe. The system also includes a probe information element coupled to the proximity probe. The probe information element includes first data corresponding to one or more first error characteristics of the proximity probe.

In another embodiment, a method includes decoding, via a processor-based monitor, first data of a probe information element corresponding to one or more first error characteristics of a proximity probe of a proximity probe system to determine the one or more first error characteristics of the proximity probe. The method also includes decoding, via a processor-based monitor, second data of a second information element relating to one or more second error characteristics of second component of the proximity probe system to determine the one or more second error characteristics of the second component. Additionally, the method includes receiving, via the processor-based monitor, an output signal from a controller of the proximity probe system. The output signal is related to a distance between the proximity probe and a conductive target object. Further, the method includes determining, via the processor-based monitor, the distance between the proximity probe and the conductive target object based at least in part upon the output signal, the one or more first error characteristics of the proximity probe, and the one or more second error characteristics of the second component.

In another embodiment, a system includes a proximity probe system including a proximity probe. The proximity probe system also includes a first physical tag disposed on the proximity probe. The first physical tag includes first data relating to one or more first attributes of the proximity probe. Additionally, the proximity probe system includes a controller coupled to the proximity probe. The controller is configured to determine an output signal based at least in part upon a feedback signal received from the proximity probe related to a distance between the proximity probe and a conductive target object. The system includes a monitor including a processor configured to receive the output signal from the controller, decode the first data to determine the one or more first attributes of the proximity probe, and determine the distance between the proximity probe and the conductive target object based at least in part upon the output signal and the one or more first attributes.

BRIEF DESCRIPTION OF THE DRAWINGS

These and other features, aspects, and advantages of the disclosed subject matter will become better understood when the following detailed description is read with reference to the accompanying drawings in which like characters represent like parts throughout the drawings, wherein.

DETAILED DESCRIPTION

Figure 1:
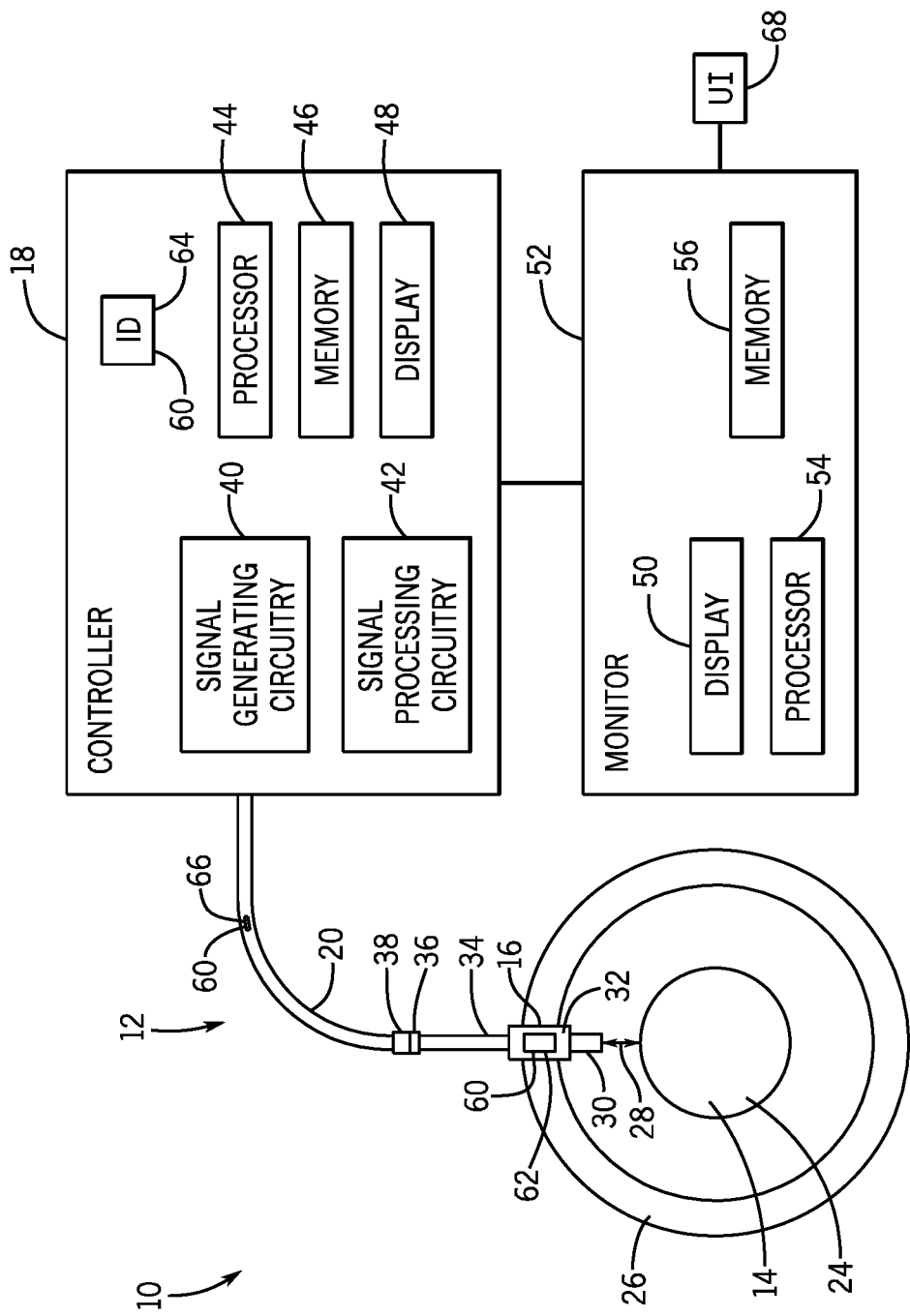
FIG. 1 is a schematic of an exemplary embodiment of a system including a proximity probe system for measuring position and/or motion of a target object, in accordance with the present techniques.

Embodiments of the disclosed subject matter provide techniques for determining characteristics of system components using an information tag. For example, some industrial systems use multiple components such as sensors, controllers, and connector cables. Each of these components can have error characteristics associated with them, such as gain characteristics. While the error characteristics of each component are typically tested at manufacture, these values can vary across multiple copies of the same component (e.g., five different copies of the same sensor can all have different error characteristics). Thus, it can be difficult for a technician to know the error characteristic of a particular component in the field—a problem that can become compounded when multiple components are connected together. Thus, some embodiments of the disclosed subject matter generally relate to identification tags that can be attached to individual components to indicate the error characteristic of the component. The identification tags can include, for examples, barcodes and RFID tags that either include the error information itself and/or a serial number that can be used to derive the error information. Other embodiments are within the scope of the disclosed subject matter.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As noted above, proximity probe systems may be used to detect the position (e.g., displacement) and/or motion (e.g., vibration) of a target object (e.g., a conductive object). For example, proximity probe systems may be used to monitor various components (e.g., rotating shafts, rotors, blades, etc.) of various machines, such as turbomachines (e.g., gas turbines, wind turbines, steam turbines, etc.), compressors, generators, and motors. In some embodiments, proximity probe systems may be used to detect out-of-alignment conditions (e.g., a distance of a component of a machine from a target position that exceeds a threshold) or surface rub conditions (e.g., a component of a machine contacts another component or a surface of the machine). By detecting out-of-alignment or surface rub conditions, the proximity probe system may enable operator action, which may reduce the wear of the machines and decrease costs and/or downtime associated with repair and/or replacement of parts.

A proximity probe system may include a proximity probe, a controller (e.g., a driver, transmitter, oscillator, sensor, Proximitor™ (registered™ of Bently Nevada, Inc.), etc.), and an extension cable that couples the proximity probe to the controller. The proximity probe may be an eddy current type probe that is configured to generate eddy current and detect changes to the eddy current field. In particular, the controller may provide an alternating-current (AC) signal to one or more coils of the proximity probe to cause the proximity probe to generate an alternating magnetic field. When a conductive target object enters the alternating magnetic field, the alternating magnetic field generates eddy currents within the target object, and the generated eddy currents create an opposing magnetic field. One or more coils of the proximity probe may receive the opposing magnetic field, which changes the impedance and output voltage of the proximity probe. The interaction of the magnetic fields is dependent upon the distance of the proximity probe and the target object. As such, the proximity probe output voltage is related (e.g., directly proportional) to the distance (e.g., gap) between the proximity probe and the target object. The controller may process one or more outputs of the proximity probe to provide an output signal related to the distance (e.g., gap) between the proximity probe and the target object. In some embodiments, the proximity probe system may also include a monitor configured to determine the distance between the proximity probe and the target object based on the output signal from the controller.

As noted above, the components of the proximity probe system (e.g., the proximity probe, the extension cable, and the controller) may be tested to verify that the error characteristics, such as the gain error (e.g., sensitivity error, incremental scale factor (ISF) error, scaling error), offset error, and/or linearity error (e.g., deviation from best fit straight line (DSL)), of each component are within working standards. However, the values of the error characteristics of each component can vary across multiple copies of the same component within a working standard. Thus, the actual error characteristics of each component may be unknown to a technician using the components in the field. By way of example, a proximity probe and an extension cable may each be manufactured with a sensitivity that falls within a working standard range of 1 volt/millimeter (V/mm) to 2 V/mm. The working standard range for the proximity probe and the extension cable may be included in the specifications for the proximity probe and the extension cable, and thus, a technician may consult the specifications to determine the working standard ranges. However, the actual sensitivity of the proximity probe and the extension cable together within the working standard range may be unknown to the technician, resulting in an interchange error within a range of approximately 2 V/mm to 4 V/mm. As a result, the interchange error of the proximity probe system, may be unknown and, thus, may be difficult to compensate for or account for in operation. This may be undesirable because some proximity probe systems may have a high interchange error if the error characteristics of one or more components of the proximity probe system are on the high end of the acceptable working standard range. Unfortunately, a high interchange error, if unknown and unaccounted for, may decrease the accuracy of the measurements of the proximity probe system.

Accordingly, at least some disclosed embodiments of the proximity probe system may be able to compensate, account, or adjust for the individual error characteristics of the components of the proximity probe system to determine (e.g., quantify) the interchange error of the proximity probe system and use the quantified interchange error to increase the accuracy of the proximity probe system. For example, the proximity probe, the extension cable, and/or the controller may each include an information element including data (e.g., information, encoded information, encoded data) relating to (e.g., corresponding to, correlated to, associated with, representing, etc.) the error characteristics. In some embodiments, the information elements may be displayed serial numbers (e.g., encrypted with the desired information) or displayed barcodes, which may be printed on physical tags (e.g., labels, etched or painted on the respective component, or displayed in any other suitable manner. Additionally, or in the alternative, the information elements may be digital encoders, memory elements, smart tags, and/or radio-frequency identification (RFID) tags that may be configured to store the data corresponding to the error characteristics and/or specifications.

In certain embodiments, the information elements may include data relating to error characteristics, such as the gain error (e.g., sensitivity error, incremental scale factor (ISF) error, scaling error), offset error, and/or linearity error (e.g., deviation from best fit straight line (DSL)), of the respective component. The actual error characteristics for each component may be determined when each component is tested to verify that the error characteristics fall within a working standard range. In some embodiments, the information element may also include data (e.g., encoded or encrypted data) relating to the specifications of the proximity probe, the extension cable, and/or the controller, such as manufacturing information (e.g., product family, serial number, etc.), length (e.g., length of the proximity probe cable, length of the extension cable, system length specifications for the controller), operating parameters, linear range, frequency response (e.g., bandwidth), operating temperature range, minimum target size (e.g., minimum target diameter), calibration information (e.g., target material that was used for calibration, length of extension cable used during calibration of proximity probe), part number, model number, manufacturing date, manufacturing origin, or any other suitable information.

Additionally, in certain embodiments, the proximity probe system may also include a monitor that may be configured to decrypt or decode the encrypted data of the information elements to determine the data (e.g., the actual error characteristics) and to use the decrypted information to compensate for or account for the individual error characteristics of the components of the proximity probe system. Some embodiments of the monitor may utilize the decrypted information to determine the interchange error of the proximity probe system and increase the accuracy of the proximity probe system, such as by utilizing components with actual error characteristics within a narrower working range.

With the foregoing in mind, FIG. 1 illustrates an exemplary embodiment of a system 10 including a proximity probe system 12 that may detect and measure static parameters (e.g., position, displacement, etc.) and/or dynamic parameters (e.g., vibration, motion, etc.) of a target object 14. As will be described in more detail below, the proximity probe system 12 may include a proximity probe 16, a controller 18 (e.g., driver, transmitter, oscillator, Proximitor™, sensor, etc.) coupled to the proximity probe 16 via an extension cable 20, and a monitor 52. In the illustrated embodiment, the target object 14 is a shaft 24 that is at least partially supported by a bearing 26. The proximity probe 16 may be mounted to the bearing 26 (e.g., through a hole in the surface of the bearing 26 or via an attachment structure, such as a mounting bracket) or otherwise secured at a distance 28 from the shaft 24. It should be appreciated that the shaft 24 and the bearing 26 may be components of any suitable machine, such as a turbomachine, a gas turbine, a wind turbine, a hydroelectric turbine, a steam turbine, a compressor, a motor, a generator, a rotating assembly, etc. Further, it should be appreciated that the proximity probe system 12 and the techniques disclosed herein may be used with any suitable target object 14, and the target object 14 is not limited to a shaft 24. By way of example, in other embodiments, the proximity probe system 12 may be configured to measure position and/or motion of one or more rotating blades, turbine stages, compressor stages, rotors, or any combination thereof, of a turbine or a compressor. Further, in other embodiments, the proximity probe system 12 may be configured to measure position and/or motion of non-rotating components of a machine.

The proximity probe 16 may include a sensing tip 30, a probe body 32, and a probe cable 34. The sensing tip 30 may be configured as an eddy current sensor and may include one or more coils. For example, the sensing tip 30 may include one or more driving coils, one or more sensing coils, and one or more reference coils. In other embodiments, the proximity probe 16 may be configured as a capacitance type probe or a Hall probe. The probe cable 34 may include a connector 36 that is configured to couple to a complementary connector 38 of the extension cable 20. The extension cable 20 also couples to the controller 18. It should be appreciated that in certain embodiments, the extension cable 20 may not be present. For example, the connector 36 of the probe cable 34 of the proximity probe 16 may be configured to couple directly to the controller 18. Further, it should be appreciated that in certain embodiments, the controller 18 may be operatively coupled to two or more proximity probes 16 and/or two or more extension cables 20. In some embodiments, the proximity probe system 12 may include two or more controllers 18, where each controller 18 is operatively coupled to one or more proximity probes 16 and/or one or more extension cables 20.

The controller 18 may include signal generating circuitry 40 configured to provide a driving signal to the sensing tip 30 of the proximity probe 16 to cause the sensing tip 30 to generate an alternating (e.g., varying) magnetic field. For example, the driving signal may drive one or more driving coils of the sensing tip 30 to generate a first magnetic field. In certain embodiments, the signal generating circuitry may include an oscillator configured to generate an oscillating electric signal (e.g., an alternating current (AC) signal, a varying frequency and/or amplitude signal). In one embodiment, the signal generating circuitry may be configured to provide a radio-frequency signal to the sensing tip 30. In other embodiments, the signal generating circuitry 40 may be configured to provide a direct current (DC) signal to the sensing tip 30. As noted above, the alternating magnetic field may generate eddy currents in the target object 14 (e.g., the shaft 24), which generate a second (e.g., an opposing) magnetic field. The second magnetic field may induce an alternating current in the sensing tip 30, such as in one or more sensing coils of the sensing tip 30. The induced alternating current may include an amplitude and phase that is dependent upon the conductive material of the target object 14 and upon the distance 28 between the sensing tip 30 and the target object 14. The second magnetic field may affect the first magnetic field based at least in part upon the distance 28 between the sensing tip 30 and the target object 14.

The controller 18 may also include signal processing circuitry 42 that is configured to receive signals (e.g., feedback) from the proximity probe 16 (e.g., from the sensing tip 30). The signal processing circuitry 42 may be configured to process and/or analyze the received signals (e.g., the induced alternating current in the sensing coils of the sensing tip 30) to generate an output signal (e.g., a voltage signal) correlated to (e.g., directly proportional to)

the distance 28 (e.g., a gap) between the sensing tip 30 and the target object 14. For example, in some embodiments, the signal processing circuitry 42 may include a demodulator, one or more amplifiers (e.g., differential amplifiers, operational amplifiers, etc.), one or more filters (e.g., low pass filters, high pass filters, band-pass filters, etc.), comparators (e.g., signal comparators, phase comparators, etc.), or any other suitable circuitry. Additionally, in embodiments in which the controller 18 is a digital Proximitor™, the signal processing circuitry 42 may include an analog-to-digital converter.

Further, in some embodiments, the controller 18 may include a processor 44 and a memory 46 (e.g., a tangible, non-transitory computer-readable medium) that stores calibration data, such as one or more calibration curves relating the distance (e.g., gap) for one or more target materials over a range of output voltages. As such, the processor 44 may be configured to determine the distance 28 between the sensing tip 30 and the target object 14 based on the output signal from the signal processing circuitry 42 using the one or more calibration curves. The processor 44 may also be configured to display the determined distance 28 on a display 48 of the controller 18 or on a display 50 of a monitor 52 coupled to the controller 44.

In certain embodiments, the monitor 52 may be configured to determine the distance 28 between the sensing tip 30 and the target object 14. For example, the monitor 52 may include a processor 54 configured to receive the output signal and the calibration data (e.g., the one or more calibration curves) from the controller 18 and to determine the distance 28 based on the received output signal and calibration data. The monitor 52 may also include a memory 56 (e.g., a tangible, non-transitory computer-readable medium) configured to store code and/or instructions executable by the processor 54 for implementing the techniques disclosed herein. The monitor 52 may display the determined distance 28 value and any other suitable information on the display 50. In certain embodiments, the monitor 52 may be a machine condition monitor, such as a Bently Nevada 3500 monitor, an Advanced Distributed Architecture Platform Technology (ADAPT) 3701 monitor, or a SCOUT monitor. Additionally, in some embodiments, the monitor 52 may be rack-based, distributed, or portable.

The accuracy of the determined distance 28 value may be based at least in part upon the error characteristics of each of the components of the proximity probe system 12 or any combination thereof. The error characteristics may include, but are not limited to the gain error (e.g., sensitivity, incremental scale factor (ISF)), the offset error, and/or the linearity error (e.g., deviation from best fit straight line (DSL)). As will be described in more detail below, the proximity probe 16, the controller 18, and/or the extension cable 20 may each include an information element 60 (e.g., identification element) that includes data corresponding to one or more attributes of the respective component, such as the error characteristics and/or the specifications (e.g., manufacturing information) of the respective components. The information element 60 may include an information label or tag, a bar code, an electronic element (e.g., a smart tag with information stored on a memory), or any combination thereof.

Each information element 60 may include data corresponding to the error characteristics for the respective component, such as the gain error (e.g., sensitivity error, incremental scale factor error, scaling error), the offset error, the linearity error (e.g., deviation from best fit straight line), and/or the information relating to the specifications of the respective component, such as manufacturing information (e.g., product family, series number, etc.), length (e.g., length of the proximity probe cable, length of the extension cable, system length specifications for the controller), linear range, frequency response (e.g., bandwidth), operating temperature range, minimum target size (e.g., minimum target diameter), calibration information (e.g., target material that was used for calibration, length of extension cable used during calibration of proximity probe), or any other suitable information. In certain embodiments, each information element 60 may store the data corresponding to the one or more error characteristics and/or the data corresponding to the specifications of the respective component. In one embodiment, each information element 60 may store the one or more error characteristics and/or the one or more specifications of the respective component. In certain embodiments, the monitor 52 may be configured to analyze the data of each information element 60 and use the data in the determination of the distance 28. By accounting for and/or adjusting for the error characteristics and/or specifications of the proximity probe 16, the controller 18, and/or the extension cable 20, the monitor 52 may determine (e.g., quantify) the interchange error of the proximity probe system 12 and increase the accuracy of the determined distance 28.

It should be noted that while the illustrated embodiment relates to the proximity probe system 12 and information elements 60 including data related to error characteristics and/or specifications of the components of the proximity probe system 12, the present techniques are applicable to any probe system including any type of probe. For example, the probe may be a temperature probe, a pressure probe, a voltage probe, a current probe, a chemical probe (e.g., a probe configured to detect the presence of one or more chemicals), a humidity probe, a flow probe, or any other suitable probe. Additionally, the information element 60 may include data related to one or more error characteristics, operating parameters, and/or specifications of the probe, such as the error characteristics, operating parameters, and specifications noted above.

In other embodiments, the monitor 52 may not determine the distance 28 using the data corresponding to the one or more error characteristics (e.g., stored information), but instead may determine the interchange error of the proximity probe system 12 and may display the interchange error on the display 50. As such, the monitor 52 may provide an unadjusted distance 28 and may provide an indication to the user regarding the interchange error of the proximity probe system 12. In certain embodiments, the monitor 52 may be configured to provide a user-perceivable indication (e.g., an audible alarm, a visible alarm, an illuminated or flashing LED, a graphic, a symbol, and/or text on the display 50, an absence of the determined gap value) in response to a determination that the determined interchange error is greater than a maximum threshold. Further, in some embodiments, the monitor 52 may send a signal or data to other systems (e.g., a controller) relating to the error interchange. By determining the interchange error of the proximity probe system 12 based on the data corresponding to the one or more error characteristics, the monitor 52 may provide useful information to a user regarding the interchange error the proximity probe system 12, which may assist the user in making adjustments to the system 10 that may decrease the interchange error and increase the accuracy of the proximity probe system 12, such as replacing one or more components of the proximity probe system 12 or adjusting the position of the proximity probe 12 relative to the target object 14.

As illustrated, the proximity probe 16 may include a probe information element 62, the controller 18 may include a controller information element 64, and the extension cable 20 may include a cable information element 66. However, in some embodiments, the controller 18 may not include the controller information element 64. It should be appreciated that the information elements 60 (e.g., the probe information element 62, the controller information element 64, and/or the cable information element 66) may be integrated with or disposed on the respective component in any suitable location of the respective component. For example, in one embodiment, the information elements 60 may be disposed on an exterior surface of the respective component. In certain embodiments, the information elements 60 may be tags, which may be painted on, etched on, adhered to, or printed to an exterior surface of the respective component. Additionally, in some embodiments, the information elements 60 may be a tag or label that is molded in place on the body of the respective element (e.g., the body of the extension cable 20). For example, the information element 60 may be molded into the body of the extension cable 20 below an outer surface of the extension cable 20, and the outer surface may be transparent to enable a user or a reader (e.g., barcode reader, RFID reader, smart tag reader, etc.) to view the information element 60.

The information elements 60 may be any suitable components for storing the error characteristics and/or specifications of the components of the proximity probe system 12 and/or for including data corresponding to the error characteristics and/or specifications of the components of the proximity probe system 12. For example, in certain embodiments, the information elements 60 may be digital encoders or memory units that may be accessed and read by the monitor 52. In one embodiment, the information elements 60 may be radio-frequency identification (RFID) tags (e.g., active or passive tags) or smart tags that may transmit the stored information to the monitor 52. In other embodiments, the information elements 60 may be tags or labels including a barcode, matrix code, or serial number (e.g., a serial number for the respective component that is encoded with the error characteristics and/or specifications). The barcode, matrix code, and/or serial number may include data corresponding to the one or more error characteristics and/or the one or more specifications of the respective component. The tags or labels may be painted on, etched on, adhered to, or printed to an exterior surface of the respective component. In certain embodiments, the barcode may be read by a barcode reader operatively coupled to the monitor 52. The monitor 52 may include a user interface 68 (e.g., a keyboard, a mouse, a touch-screen display, etc.) to enable a user to enter the serial numbers displayed on the information elements 60. Further, the information elements 60 may be the same type for each component, or the type may vary. Regardless of the type of the information elements 60, the monitor 52 may be configured to read the data (e.g., stored information) from each information element 60 and, in embodiments in which the data is encoded or encrypted, may decode or decrypt the data.

As noted above, the actual error characteristics for the proximity probe 16, the controller 18, and the extension cable 20 may be determined during the testing (e.g., calibration) of the respective components. The actual error characteristics may then may be encoded or encrypted, and stored on the respective information element 60. For example, the proximity probe 16, the controller 18, and the extension cable 20 may be tested using a working standard system (e.g., a testing system, calibration system) with known parameters. In certain embodiments, the proximity probe 16 may be tested with the extension cable 20, while the controller 18 may be tested separately. During the testing of the proximity probe 16 and the extension cable 20, the distance between the proximity probe 16 and a target object may be varied, and the working standard system may record the output signal to generate testing data (e.g., calibration data, calibration curves) for the proximity probe 16 and the extension cable 20. During the testing of the controller 18, the working standard system may generate testing data (e.g., calibration data, calibration curves) on the controller 18 for one or more target materials and/or one or more system lengths. For example, the working standard system may generate a first set of testing data on the controller 18 while the controller 18 is coupled to a proximity probe and a first extension cable having a first length, and the working standard system may generate a second set of testing data while the controller 18 is coupled to the proximity probe and a second extension cable having a second length. The error characteristics may be derived from the testing data (e.g., calibration data, calibration curves), as will be described in more detail below with respect to FIG. 2.

Figure 2:
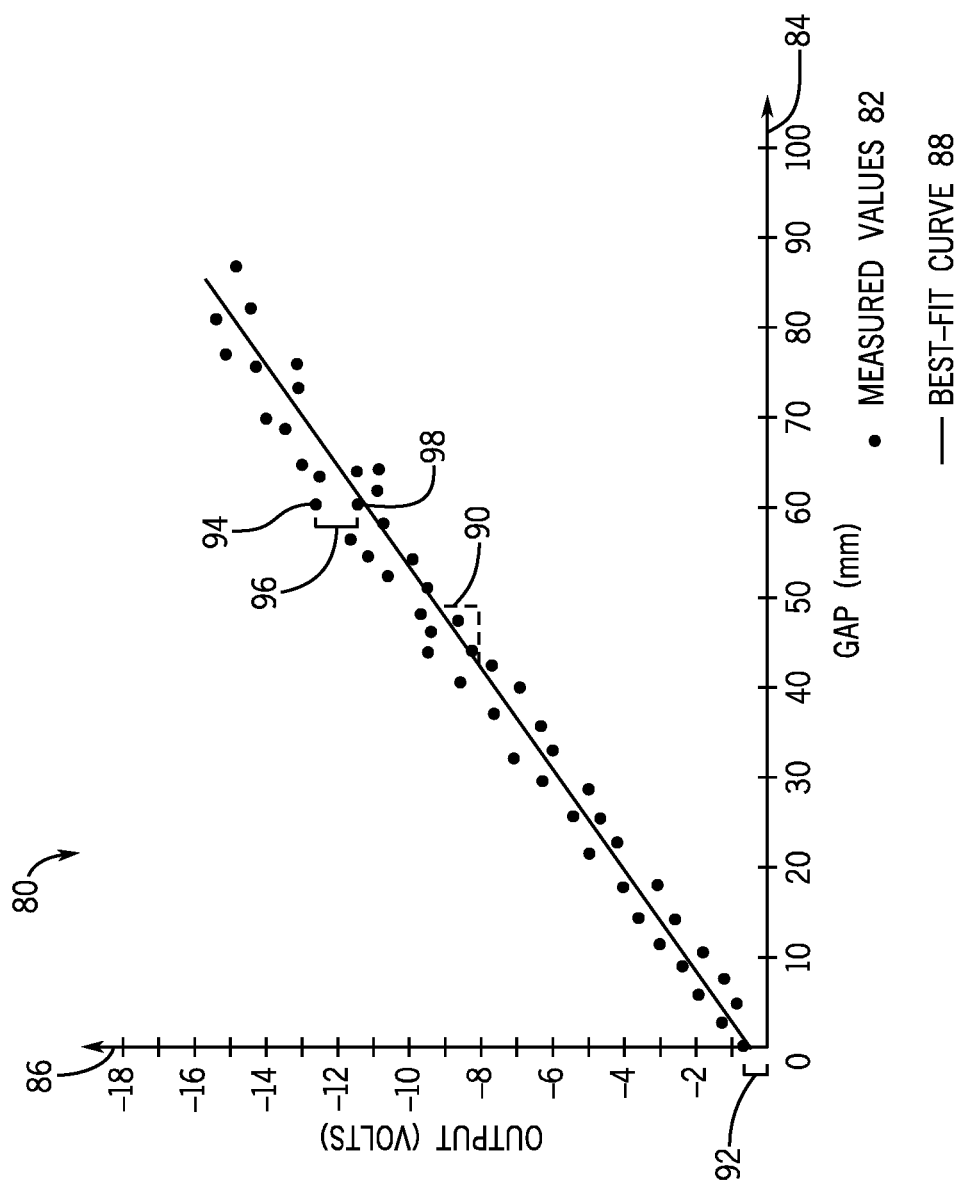
FIG. 2 is a graph illustrating an embodiment of exemplary measured values generated during testing of a component of a proximity probe system and a best-fit curve derived from the measured values, in accordance with the present techniques.

FIG. 2 is an embodiment of an exemplary graph 80 illustrating a plurality of measured values 82 that may be generated during the testing of the proximity probe 16, the controller 18, and/or the extension cable 20. The graph 80 illustrates gap values (e.g., distance values) in millimeters along an x-axis 84 and output voltage in volts along a y-axis 86. The graph 80 also includes a best-fit curve 88, which may be generated by the working standard system based on at least a portion of the plurality of measured values 82. That is, in some embodiments, the best-fit curve 88 may be determined based on the linear range of the proximity probe 16. The best-fit curve 88 may be a linear regression line determined using any suitable regression technique (e.g., least-squares regression).

The gain (also commonly referred to as sensitivity, incremental scale factor, or scale factor) of the measured values 82 may be determined from the slope 90 of the best-fit curve 88. The determined gain may be compared against the median of the working standard range for the gain, and the difference between the determined gain and the median may be determined. For example, a working standard range for the gain of a component may be 1 V/mm to 2 V/mm, and the actual gain determined for the component may be 1.8 V/mm. Accordingly, for this example, the difference between the actual gain and the median of the working standard range (i.e., 1.5 V/mm) is 0.3 V/mm. As used herein, the gain error (e.g., sensitivity error, incremental scale factor error, scaling error) is defined as the difference (e.g., deviation) of the determined gain (e.g., sensitivity, incremental scale factor) from the median of the working standard range for the gain (e.g., sensitivity error, incremental scale factor error).

Generally, proximity probe systems may be "zeroed" during initial calibration or setup, such that the output voltage is zero when the gap value is zero. As used herein, offset error is defined as a non-zero voltage output observed when the gap value is zero. As illustrated, the best-fit curve 88 includes an offset error 92.

The linearity error may also be determined from the best-fit curve 88. As used herein, the linearity error is defined as maximum deviation from the best-fit curve and of the measured values from the best-fit curve over the linear range of the measured values. For example, a certain measured value 94 of the measured values 82 is the farthest away from the best-fit curve 88 as compared to the remaining measured values 82 over the linear range of the measured values 82, and a deviation 96 between the measured value 94 and a corresponding data point 98 of the best-fit curve 88 is the linearity error of the measured values 82. The linearity error provides an indication of the "straightness" of the measured values 82.

Figure 3:
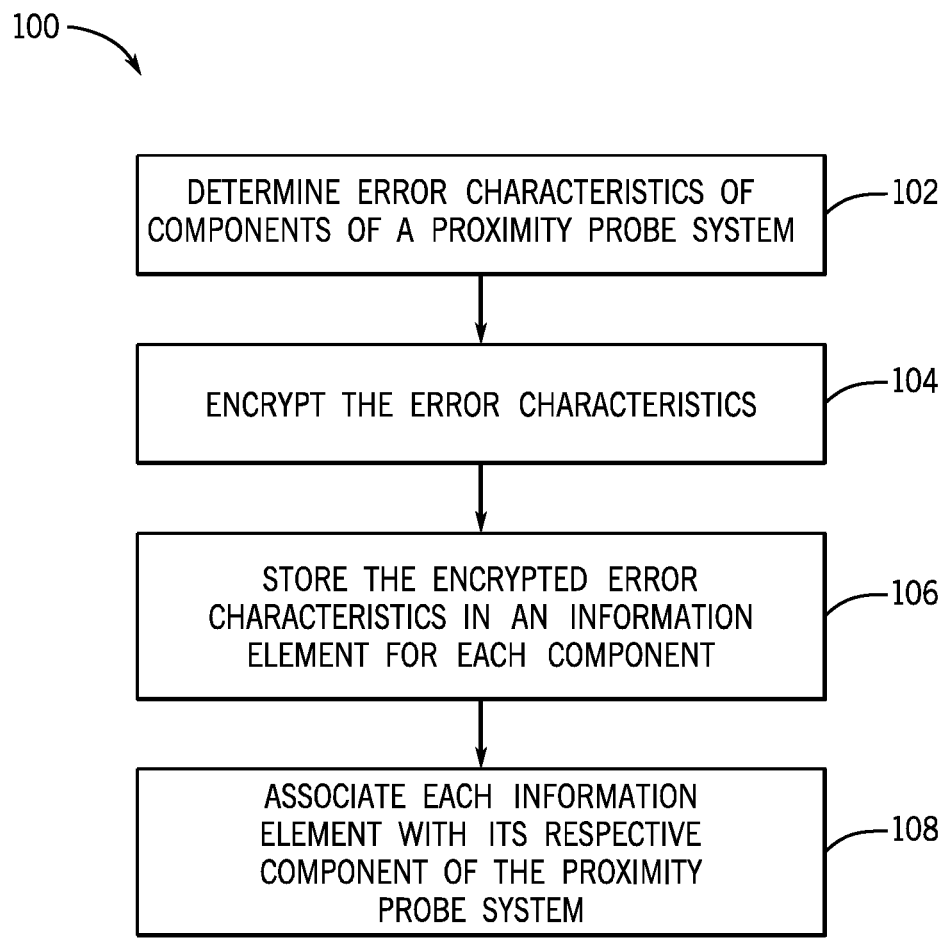
FIG. 3 is an embodiment of an exemplary method for providing components of a proximity probe system with stored information relating to their respective error characteristics, in accordance with the present techniques.

FIG. 3 illustrates an embodiment of a method 100 for providing components of a proximity probe system (e.g., the proximity probe system 12) with stored information relating to their respective error characteristics. The method 100 may be a computer-implemented method. For example, one or more steps of the method 100 may be executed using the controller 18 (e.g., the processor 44 of the controller 18) and/or the monitor 52 (e.g., the processor 54 of the monitor 52). The method 100 may include determining (block 102) one or more error characteristics of one or more components of the proximity probe system 12, such as the proximity probe 16, the controller 18, and/or the extension cable 20). In certain embodiments, the error characteristics may include the gain error (e.g., the sensitivity error, the incremental scale factor error, scaling error), the offset error, and/or the linearity error. Determining the one or more error characteristics may include generating testing data for the respective components, determining a best-fit curve (e.g., a best-fit regression line), and determining the one or more error characteristics based on the testing data and/or the best-fit curve, as described above with respect to FIG. 2.

In certain embodiments, the method 100 may also include encoding or encrypting (block 104) the one or more error characteristics and storing (block 106) the encoded or encrypted error characteristics in an information element. It should be appreciated that the error characteristics or information relating to the error characteristics for each component may be stored in an information element 60 for the respective component. In some embodiments, a barcode or a serial number, such as an encrypted serial number, may include the stored information that corresponds to the error characteristics. Further, it should be appreciated that in other embodiments, the error characteristics of the components may not be encoded or encrypted. The information elements 60 may be encoded serial numbers, barcodes, digital encoders, memory units, RFID tags, smart tags, or any other suitable element for storing or representing information.

Additionally, the method 100 may include associating each information element 60 with its respective component of the proximity probe system (block 108). For example, associating the information element 60 with its respective component may include disposing the information element 60 on or in the respective component or coupling the information element 60 to the respective component. In other embodiments, associating the information element 60 with the respective component may include providing the information element 60 with (e.g., disposing on or in) manufacturing packaging storing the respective component.

Figure 4:
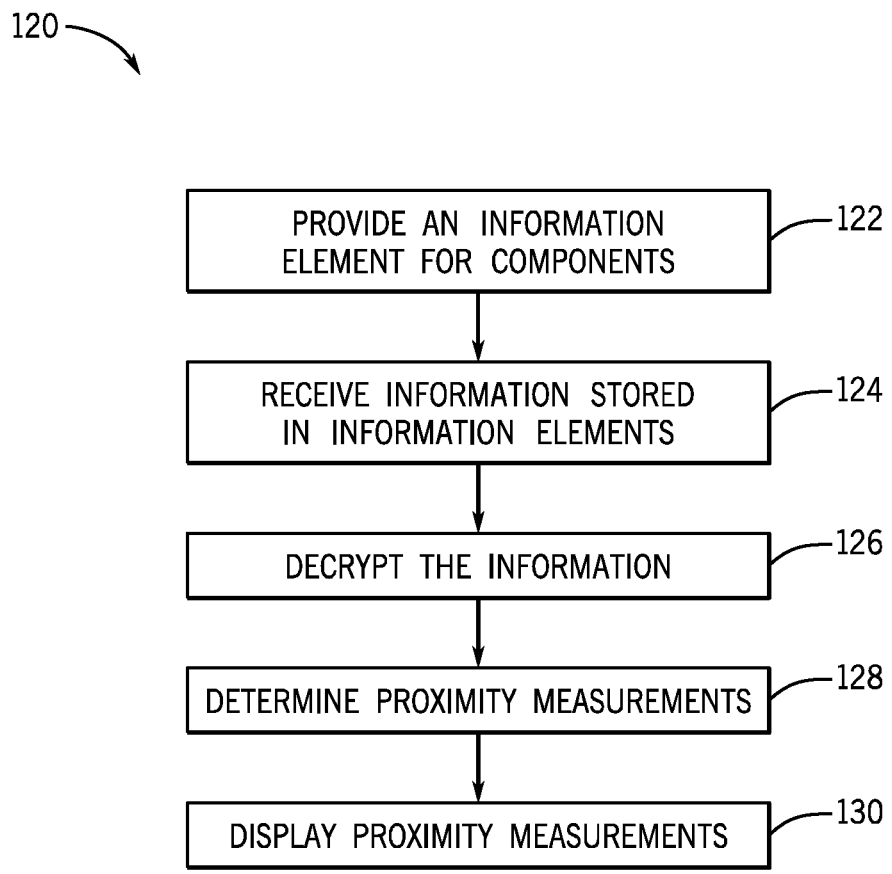
FIG. 4 is an exemplary embodiment of a method for determining proximity measurements, using a proximity probe system, based at least in part upon error characteristics of the components of the proximity probe system, in accordance with the present techniques.

FIG. 4 illustrates an embodiment of an exemplary method 120 for determining proximity measurements (e.g., gap values and/or vibration) using a proximity probe system (e.g., the proximity probe system 12) based at least in part upon the error characteristics of the components of the proximity probe system, such as the proximity probe 16, the controller 18, and/or the extension cable 20. The method 120 may be a computer-implemented method. For example, one or more steps of the method 100 may be executed using the controller 18 (e.g., the processor 44 of the controller 18) and/or the monitor 52 (e.g., the processor 54 of the monitor 52). The method 120 may include providing (block 122) an information element 60 for each of the proximity probe 16, the controller 18, and the extension cable 20 (e.g., the probe information element 62, the controller information element 64, and the cable information element 66) that stores one or more error characteristics for the respective component. However, it should be appreciated that in certain embodiments, only one information element 60 may be provided (e.g., one of the probe information element 62, the controller information element 64, or the cable information element 66) or only two information elements 60 may be provided (e.g., two of the probe information element 62, the controller information element 64, and the cable information element 66). Providing (block 122) the information elements 60 for each respective component may include the steps and techniques discussed above with respect to FIG. 3.

The method 120 may also include receiving (block 124) the information stored in the information elements 60 and decoding or decrypting (block 126) the information stored in the information elements 60 (if encoded or encrypted). As set forth above, the monitor 52 may be configured to receive and decode the information from the information elements 60. In certain embodiments, the monitor 52 may be configured to determine the error characteristics of the respective component by decoding or decrypting the information stored in the respective information element 60. In some embodiments, the monitor 52 may be configured to receive the encoded serial numbers via the user interface 68. In other embodiments, the monitor 52 may be configured to receive the information stored in the information elements 60 (e.g., digital encoders, memory units, radio-frequency identification tags) via a wired or wireless connection. In one embodiment, the monitor 52 may be configured to receive the information stored in the information elements 60 (e.g., RFID tags, barcodes, smart tags) via a reader (e.g., an RFID reader, a barcode reader, or a smart tag reader) that may be integral to the monitor 52 or operatively coupled to the monitor 52.

The method 120 may also include determining (block 128) proximity measurements (e.g., the distance 28 between the sensing tip 30 of the proximity probe 16 and the target object 14 and/or vibrations of the target object 14) based at least in part upon the error characteristics stored in the information elements 60. In certain embodiments, the processor 54 of the monitor 52 may be configured to determine the proximity measurements using algorithms, code, and/or instructions stored in the memory 56 of the monitor 52. As set forth above, the distance 28 (e.g., gap) may be related to (e.g., directly proportional to) the output voltage from the sensing tip 30 of the proximity probe 16. For example, in certain embodiments, the distance 28 may be determined based on the following equation:

$$y = mx + b,$$

where y is the gap value, x is the output voltage, m is the gain, and b is the offset. The value of b may be the offset error stored in the information element 60, and the value of m may be determined based on the gain error stored in the information element 60 and the median of the working standard range for the gain. However, it should be appreciated that in other embodiments, the information element 60 may be configured to store the actual value of the gain in addition to or instead of the gain error.

Additionally, the method 120 may include displaying (block 130) the determined proximity measurements. For example, the proximity measurements may be displayed on the display 50 of the monitor 52 and/or on the display 48 of the controller 18. In certain embodiments, the method 120 may also include displaying information related to the stored information of the information elements 60, such as the error characteristics and/or any specifications stored on the information elements 60. In one embodiment, the method 120 may also include providing a user-perceivable indication (e.g., an indicator light or a graphic, symbol, or text on the display 50) indicating that the proximity measurements have been determined based on the actual error characteristics for the components of the proximity probe system.

Figure 5:
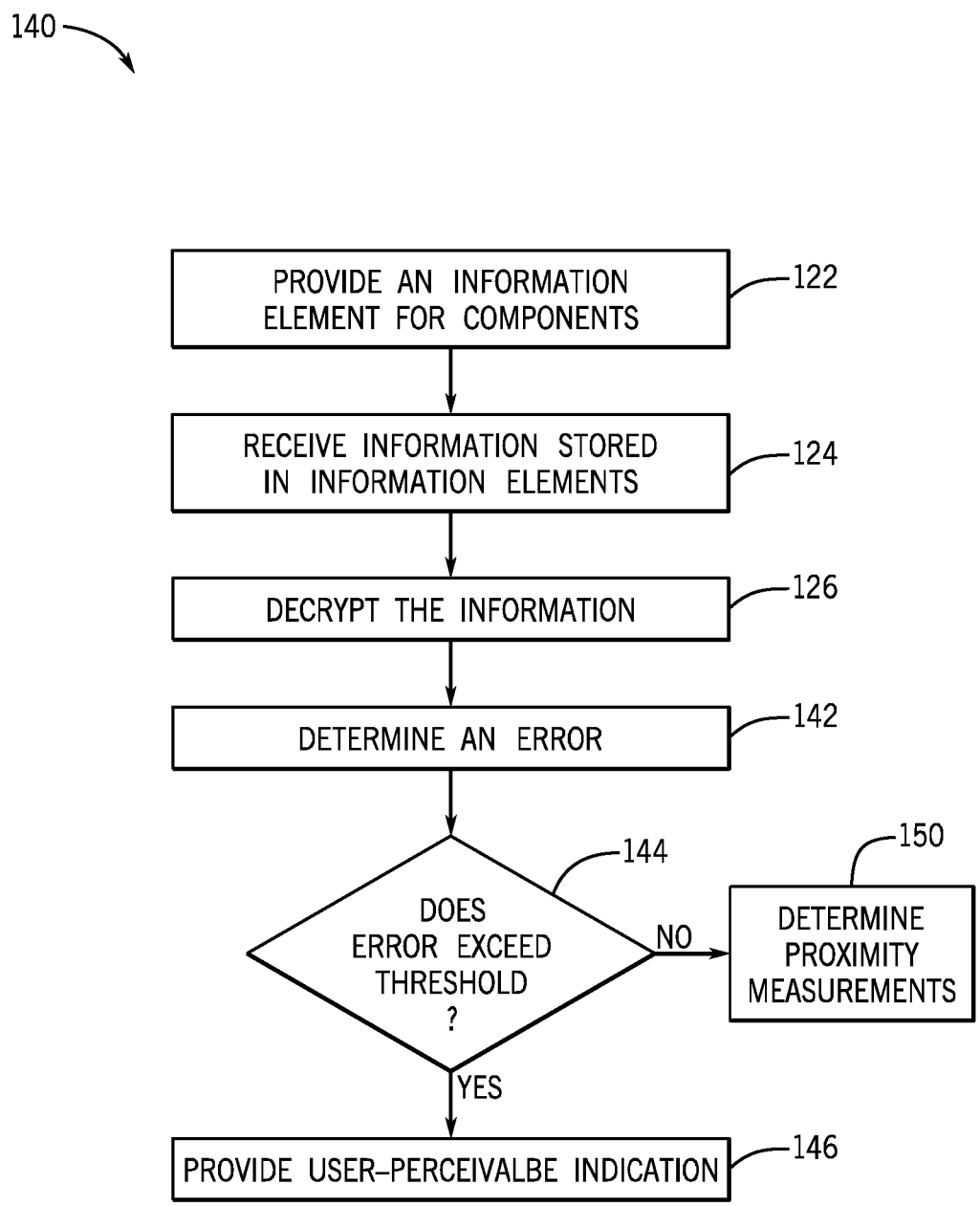
FIG. 5 is an embodiment of an exemplary method for determining the interchange error of a proximity probe system based on error characteristics of the components of the proximity probe system, in accordance with the present techniques.

FIG. 5 illustrates an embodiment of an exemplary method 140 for determining the interchange error of a proximity probe system (e.g., the proximity probe system 12) based on the error characteristics of the components of the proximity probe system (e.g., the proximity probe 16, the controller 18, and the extension cable 20). The method 140 may be a computer-implemented method. For example, one or more steps of the method 140 may be executed using the controller 18 (e.g., the processor 44 of the controller 18) and/or the monitor 52 (e.g., the processor 54 of the monitor 52). The method 140 may include providing (block 122) an information element 60 for each of the proximity probe 16, the controller 18, and the extension cable 20 that stores one or more error characteristics for the respective component, receiving (block 124) the information stored in the information elements 60, and decoding or decrypting (block 126) the information stored in the information elements 60 (if encoded or encrypted), as described above with respect to FIG. 4.

The method 140 may also include determining (block 142) an interchange error (e.g., via the processor 54 of the monitor 52) of the proximity probe system based at least in part upon the error characteristics stored in the information elements 60. In certain embodiments, determining the interchange error may include combining the error values for each error characteristic. For example, the gain error for each of the proximity probe 16, the controller 18, and the extension cable 20 may be combined (e.g., added together) to determine a combined gain error, and the offset error for each of the proximity probe 16, the controller 18, and the extension cable 20 may be combined (e.g., added together) to determine a combined offset error. An interchange error may be determined based on the combined gain and offset errors.

Additionally, the method 140 may include determining (node 144) whether the interchange error exceeds a predetermined threshold (e.g., via the processor 54 of the monitor 52). Additionally or alternatively, the method 140 may include determining whether the combined gain error and/or the combined offset error exceed a respective predetermined threshold. The method 140 may also include providing a user-perceivable indication of a high interchange error in response to a determination that the interchange error exceeds the predetermined threshold (block 146). It should be appreciated that the user-perceivable indication may also be provided in response to a determination that the combined gain error and/or the combined offset error exceeds the respective predetermined threshold. The user-perceivable indication may include an audible indication, such as an audible alarm provided via a speaker of the monitor 52, or a visual indication, such as an illuminated or flashing indicator light (e.g., via an indicator light of the monitor 52) or a symbol, graphic, and/or text (e.g., an error message) displayed on the display 50 of the monitor 52. Additionally or alternatively, the user-perceivable indication may include displayed values of the interchange error, the combined gain error, and/or the combined offset error. Further, in certain embodiments, the user-perceivable indication may be an absence of displayed proximity measurements during operation of the proximity probe system 12. If the interchange error does not exceed the predetermined threshold, the method 140 may include determining one or more proximity measurements (block 150), which may be determined based at least in part upon the error characteristics of one or more components of the proximity probe system and the output signal of the controller 18.

As noted above, in certain embodiments, the information elements 60 may also be configured to store information relating to the specifications of the proximity probe 16, the controller 18, and/or the extension cable 20. For example, the information elements 60 may be configured to store information relating to the specifications of the components, such as the manufacturing information (e.g., product family, series number, etc.), length (e.g., length of the proximity probe cable, length of the extension cable, system length specifications for the controller), linear range, frequency response (e.g., bandwidth), operating temperature range, minimum target size (e.g., minimum target diameter), calibration information (e.g., target material that was used for calibration, length of extension cable used during calibration of proximity probe), or any other suitable information. In certain embodiments, the monitor 52 may be configured to display and/or analyze the specification information. For example, in certain embodiments, the monitor 52 may be configured to analyze the specification information to verify that the proximity probe system 12 is assembled with the appropriate components.

Figure 6:
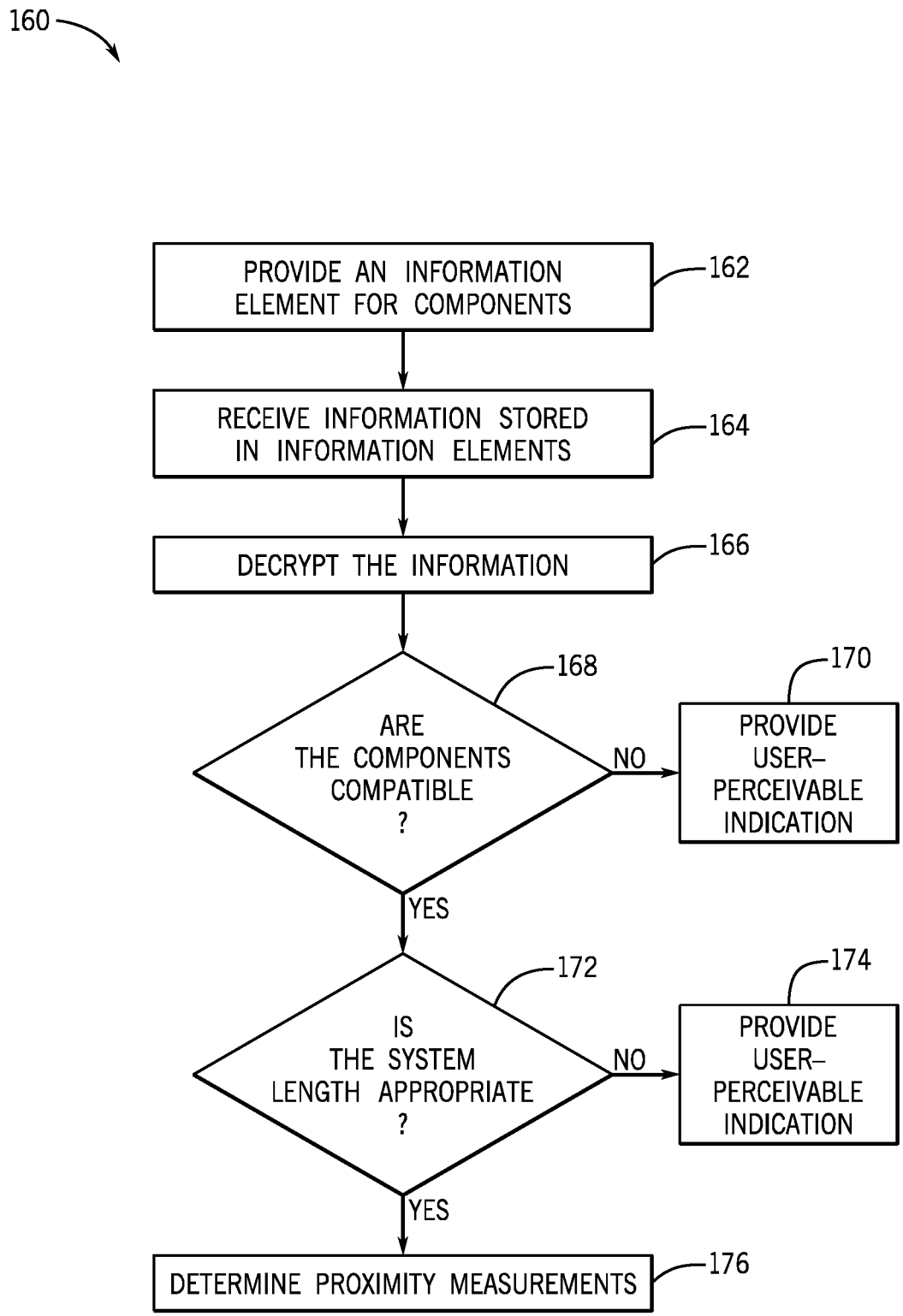
FIG. 6 is an embodiment of an exemplary method for verifying that a proximity probe system is assembled with appropriate components, in accordance with the present techniques.

FIG. 6 illustrates an embodiment of an exemplary method 160 for verifying that a proximity probe system (e.g., the proximity probe system 12) is assembled with the appropriate components (e.g., the proximity probe 16, the controller 18, and the extension cable 20). The method 160 may be a computer-implemented method. For example, one or more steps of the method 160 may be executed using the controller 18 (e.g., the processor 44 of the controller 18) and/or the monitor 52 (e.g., the processor 54 of the monitor 52). The method 160 may include providing (block 162) an information element 60 for each of the proximity probe 16, the controller 18, and the extension cable 20 that stores information relating to one or more specifications for the respective component, receiving (block 164) the information stored in the information elements 60, and decoding or decrypting (block 166) the information stored in the information elements 60 (if encoded or encrypted), as described above with respect to FIG. 4. In certain embodiments, the information relating to one or more specifications of the respective components may include manufacturing information (e.g., product family, series number, etc) and length information (e.g., length of the proximity probe 16, length of the extension cable 20, and system length requirements of the controller 18). This information may be desirable because each of the proximity probe 16, the controller 18, and the extension cable 20 may be designed to work with a specific product family and/or product series and system length (e.g., the combined length of the proximity probe 16 and the extension cable 20 is trimmed to a specific impedance characteristic that is designed to work with a controller 18 having that specific impedance characteristic (e.g., system length requirement)). Additionally, the manufacturing information may be desirable because different product families and/or product series may have different working standard ranges.

The method 160 may also include determining whether the proximity probe 16, the controller 18, and the extension cable 20 are compatible (node 168). Determining whether the proximity probe 16, the controller 18, and the extension cable 20 are compatible may include determining whether the proximity probe 16, the controller 18, and the extension cable 20 are in the same product family and/or series based on the manufacturing information stored in the information elements 60. The method 160 may include providing (block 170) a user-perceivable indication (e.g., an audible alarm, an illuminated or flashing indicator light, and/or a graphic, symbol, or text on the display 50 of the monitor 52) that the components are incompatible in response to a determination that one or more of the components are incompatible. In certain embodiments, the user-perceivable indication may include displaying the manufacturing information for each component.

The method 160 may also include determining (node 172) whether the system length is appropriate. Determining whether the system length is appropriate may include determining the combined length of the proximity probe 16 and the extension cable 20 based on the length information stored in the probe information element 62 and the cable information element 66 and comparing the combined length to the system length requirement (e.g., the impedance characteristic) of the controller 18 stored in the controller information element 64. Additionally, the method 160 may include providing (block 174) a user-perceivable indication (e.g., an audible alarm, an illuminated or flashing indicator light, and/or a graphic, symbol, or text on the display 50 of the monitor 52) of a system length error in response to a determination that combined length of the proximity probe 16 and the extension cable 20 do not meet the system length requirements of the controller 18. In certain embodiments, the user-perceivable indication may include displaying the length of the proximity probe 16, the length of the extension cable 20, the combined length of the proximity probe 16 and the extension cable 20, and/or the system length requirements of the controller 18. In response to determining (block 176) that the components are compatible and the system length is appropriate, the method 160 may proceed to determine one or more proximity measurements.

Technical effects of the disclosed subject matter can include increasing the accuracy of proximity measurements and/or reducing the interchange error of the proximity probe system 12. In particular, this may be accomplished by providing the information elements 60 that include data relating to the error characteristics and/or the specifications of one or more components of the proximity probe system 12. For example, the data relating to the error characteristics may be used to compensate, account, or adjust for the individual error characteristics of the respective component of the proximity probe system 12 to determine (e.g., quantify) the interchange error of the proximity probe system 12 and use the quantified interchange error to increase the accuracy of the proximity probe system 12. The information element 60 may include data (e.g., information, encoded information, encoded data) relating to the error characteristics, such as the gain error (e.g., sensitivity error, incremental scale factor (ISF) error, scaling error), offset error, and/or linearity error (e.g., deviation from best fit straight line (DSL)), of the respective component. In some embodiments, the proximity probe system 12 may utilize the information from the information elements 60 to determine the interchange error of the proximity probe system 12 and increase the accuracy of the proximity probe system 12, such as by utilizing components with actual error characteristics within a narrower working range.

This written description uses examples to disclose the subject matter herein, including the best mode, and also to enable any person skilled in the art to practice the disclosed subject matter, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a proximity probe;
   a probe information element coupled to the proximity probe, wherein the probe information element includes first data corresponding to one or more determined first error characteristics of the proximity probe within probe working standard ranges, and wherein the determined first error characteristics are derived from a first test of the proximity probe and includes a linearity error of the proximity probe; and
   a processor is configured to determine an interchange error of the system based at least in part on the determined first error characteristics received from the probe information element.

2. The system of claim 1, wherein the linearity error is a maximum deviation between measurements acquired by the proximity probe and a best fit straight line of the proximity probe measurements.

3. The system of claim 1, wherein the first data comprises an encoded serial number for the proximity probe.

4. The system of claim 3, wherein the probe information element comprises a physical tag disposed on an exterior surface of the proximity probe.

5. The system of claim 1, wherein the probe information element comprises a digital encoder, a memory unit, or a radio-frequency identification tag.

6. The system of claim 1, wherein the probe information element comprises second data corresponding to a length of the proximity probe and manufacturing information of the proximity probe.

7. The system of claim 1, comprising:
   an extension cable configured to couple to the proximity probe; and
   a cable information element coupled to the extension cable, wherein the cable information element includes second data corresponding to one or more determined second error characteristics of the extension cable within extension cable working standard ranges, wherein the determined second error characteristics are derived from a second test of the extension cable;
   wherein the processor is configured to determine the interchange error of the system based at least in part on the determined first error characteristics of the proximity probe and the determined second error characteristics of the extension cable.

8. The system of claim 7, comprising a controller configured to couple to the extension cable, wherein the controller includes:
   signal generating circuitry configured to provide a driving signal to the proximity probe to cause the proximity probe to generate a first magnetic field; and
   signal processing circuitry configured to receive a feedback signal from the proximity probe based at least in part on a second magnetic field received by the proximity probe, and to process the feedback signal to generate an output signal based at least in part on a difference between the first magnetic field and the second magnetic field, wherein the difference is based at least in part on a distance between a conductive target object and the proximity probe.

9. The system of claim 8, further comprising a monitor operatively coupled to the controller, wherein the monitor includes the processor configured to,
receive the first data of the probe information element relating to the one or more first error characteristics and the second data of the cable information element relating to the one or more second error characteristics,
determine the one or more first error characteristics of the proximity probe from the first data and the one or more second error characteristics of the extension cable from the second data,
receive the output signal from the controller, and
determine the distance between the conductive target object and the proximity probe based at least in part upon the output signal, the one or more first error characteristics of the proximity probe, and the one or more second error characteristics of the extension cable.

10. The system of claim 9, wherein the probe information element and the cable information element each comprise an encoded serial number, and wherein the monitor includes a user interface configured to receive an input relating to the encoded serial numbers for the probe information element and the cable information element.

11. A method, comprising:
determining one or more first error characteristics of a proximity probe of a proximity probe system;
determining one or more second error characteristics of a second component of the proximity probe system;
encoding, via a processor-based monitor, first data corresponding to the one or more first error characteristics of the proximity probe;
storing the encoded first data in a probe information element;
encoding, via the processor-based monitor, second data corresponding to the one or more second error characteristics of the second component;
storing the encoded second data in a second information element;
associating the probe information element with the proximity probe; and
associating the second probe information element with the second component.

12. The method of claim 11, wherein the one or more first error characteristics of the proximity probe include a first linearity error of the proximity probe, and wherein the one or more second error characteristics of the second component includes a second linearity error of the second component.

13. The method of claim 11, wherein the probe information element comprises a first encoded serial number and the second information element comprises a second encoded serial number.

14. The method of claim 12, wherein determining the first linearity error comprises:
generating testing data by each of the proximity probe and the second component;
performing a best-fit straight line to each of the proximity probe testing data and the second component testing data;
determining the first linearity error as the maximum deviation of the proximity probe testing data from the best-fit straight line to the proximity probe testing data; and
determining the second linearity error as the maximum deviation of the second component testing data from the best-fit straight line to the second component testing data.

15. The method of claim 11, wherein the second component of the proximity probe system comprises an extension cable or a controller.

16. A system, comprising:
a proximity probe system, having,
a proximity probe;
a first physical tag disposed on the proximity probe, wherein the first physical tag includes first data relating to one or more determined first error characteristics of the proximity probe within probe working standard ranges derived from a first test of the proximity probe;
a controller coupled to the proximity probe, wherein the controller is configured to determine an output signal based at least in part upon a feedback signal received from the proximity probe related to a distance between the proximity probe and a conductive target object; and
a monitor including a processor configured to,
receive the output signal and the determined first error characteristics of the proximity probe from the controller,
determine an interchange error of the proximity probe system based at least in part on the determined first error characteristics, and
display the interchange error.

17. The system of claim 16, comprising:
an extension cable coupled to the proximity probe; and
a second physical tag disposed on the extension cable, wherein the second physical tag comprises second data relating to one or more determined second error characteristics of the extension cable;
wherein the processor of the monitor is configured to,
receive the determined second error characteristics of the extension cable, and
determine the interchange error of the proximity probe system based at least in part on the determined first error characteristics of the proximity probe and the determined second error characteristics of the extension cable.

18. The system of claim 16, wherein the first physical tag comprises a first encoded serial number, a first barcode, or a first radio-frequency identification (RFID) tag having the one or more first attributes.

19. The system of claim 8, further comprising a controller information element coupled to the extension cable, wherein the controller information element comprises third data corresponding to one or more determined third error characteristics of the controller within controller working standard ranges, and wherein the processor is configured to determine the interchange error of the system based at least in part on the determined first error characteristics of the proximity probe and the determined third error characteristics of the controller.

20. The method of claim 11, wherein associating the probe information element with the proximity probe includes disposing the probe information element on or in the proximity probe, and wherein associating the second information element with the second component includes disposing the second information element on or in the second component.

21. The system of claim 16, wherein the processor is further configured to determine that the interchange error is greater than a maximum threshold, and the monitor is configured to provide a user perceivable indication in response to the determination by the processor that the interchange error is greater than the maximum threshold.

* * * * *